US012630302B2

(12) United States Patent
Esterle

(10) Patent No.: US 12,630,302 B2
(45) Date of Patent: May 19, 2026

(54) AUTOMATIC DIAGNOSTIC METHOD FOR AT LEAST ONE ENGINE EQUIPPING AN AIRCRAFT, AIRCRAFT AND ARRANGEMENT IMPLEMENTING THE METHOD

(71) Applicant: AIRBUS HELICOPTERS, Marignane Cedex (FR)

(72) Inventor: Florent Esterle, Salon de Provence (FR)

(73) Assignee: AIRBUS HELICOPTERS, Marignane Cedex (FR)

( * ) Notice: Subject to any disclaimer, the term of this patent is extended or adjusted under 35 U.S.C. 154(b) by 246 days.

(21) Appl. No.: 18/209,058

(22) Filed: Jun. 13, 2023

(65) Prior Publication Data

US 2023/0406535 A1     Dec. 21, 2023

(30) Foreign Application Priority Data

Jun. 15, 2022    (FR) ....................................... 2205801

(51) Int. Cl.
| | |
|---|---|
| *B64D 45/00* | (2006.01) |
| *B64F 5/60* | (2017.01) |
| *F01D 21/00* | (2006.01) |

(52) U.S. Cl.
CPC ................ *B64D 45/00* (2013.01); *B64F 5/60* (2017.01); *F01D 21/003* (2013.01); *B64D 2045/0085* (2013.01); *F05D 2260/80* (2013.01)

(58) Field of Classification Search
CPC ............ B64D 45/00; B64D 2045/0085; B64F 5/60; F01D 21/003; F05D 2260/80; G05B 2219/45071; G05B 23/0283
See application file for complete search history.

(56) References Cited

U.S. PATENT DOCUMENTS

| | | | | |
|---|---|---|---|---|
| 10,127,257 | B2 * | 11/2018 | Bothier | .............. G05B 23/0283 |
| 10,814,883 | B1 * | 10/2020 | Dixit | ..................... B60W 50/02 |
| 2006/0089761 | A1 | 4/2006 | Pettigrew et al. | |

(Continued)

FOREIGN PATENT DOCUMENTS

| | | |
|---|---|---|
| EP | 2623748 A1 | 8/2013 |
| EP | 3217242 A1 | 9/2017 |
| FR | 3006785 A1 | 12/2014 |

OTHER PUBLICATIONS

French Search Report for French Application No. FR2205801, Completed by the French Patent Office, Dated Feb. 23, 2023, 9 pages.

*Primary Examiner* — Aniss Chad
*Assistant Examiner* — Christine Nguyen Huynh
(74) *Attorney, Agent, or Firm* — BROOKS KUSHMAN P.C.

(57)     ABSTRACT

An automatic diagnostic method for monitoring a state of health of at least one engine equipping an aircraft, the method comprising the periodic in-flight acquisition of a plurality of flight data, with sensors, the plurality of flight data being representative of a plurality of physico-chemical parameters, the identification, with a controller, from the plurality of flight data, of at least one predetermined engine health check phase and the isolation, with the controller, of a sequence of significant data from the plurality of flight data produced during the at least one engine health check phase.

20 Claims, 5 Drawing Sheets

(56)     References Cited

U.S. PATENT DOCUMENTS

| 2013/0199204 | A1  | 8/2013 | Camhi et al. |
| 2016/0140155 | A1  | 5/2016 | Bothier et al. |
| 2016/0171796 | A1* | 6/2016 | Volponi ............... G06F 16/245 |
|  |  |  | 701/14 |
| 2021/0055717 | A1  | 2/2021 | Tucker et al. |

\* cited by examiner

Ng

Zp

Ng

Zp

AUTOMATIC DIAGNOSTIC METHOD FOR AT LEAST ONE ENGINE EQUIPPING AN AIRCRAFT, AIRCRAFT AND ARRANGEMENT IMPLEMENTING THE METHOD

CROSS-REFERENCE TO RELATED APPLICATIONS

This application claims priority to French patent application No. FR 22 05801 filed on Jun. 15, 2022, the disclosure of which is incorporated in its entirety by reference herein.

TECHNICAL FIELD

The present disclosure relates to an automatic diagnostic method for monitoring the evolution of a state of health of at least one engine equipping an aircraft such as an airplane or a rotorcraft.

BACKGROUND

Such an engine may advantageously be a turboshaft engine rotating at least a propeller or a rotor contributing to the propulsion and/or lift of the aircraft in the air. Furthermore, such an engine may be referred to as an "installed engine" and its performances then takes into account, in particular, a fresh-air intake, a nozzle, a speed of movement of the aircraft or additional power take-offs. Hereinafter, for the sake of simplicity, the term "engine" will refer to such an engine installed in an aircraft. Furthermore, a health check may be carried out in order to check that the performances of an engine have not fallen below an acceptable value.

Indeed, an aircraft engine may produce a current power that decreases with age and the conditions of use of this engine. The current power of an engine therefore decreases as it is used and as external conditions change.

An engine health index may then be calculated in order to check that the engine is able to deliver more power than a guaranteed minimum power.

Curves of the available power of an engine may then be determined by calculations or tests, for example, as a function of the altitude of the aircraft and the temperature of the air outside the aircraft, for each of the operating ratings of an engine. Similarly, the service life of the engine and the guaranteed minimum power for each rating may be determined. Such a guaranteed minimum power corresponds to the power that the engine will deliver when it has completed its service life, such an engine being referred to hereinafter as an "aged engine" for the sake of convenience.

In other words, such an available power "has" a guaranteed minimum level at which the performance of an aircraft corresponding to the flight manual is calculated. An engine health check therefore makes it possible to guarantee that the performance of the drive unit remain consistent with the assumptions used when drawing up the flight manual of the aircraft, and beyond that to evaluate, by using predictive methods, the future point in time when this may no longer be the case, as well as to detect any failure that may affect the entire engine installed on the aircraft.

In order to check that the engine is operating correctly, a health check should therefore be carried out in order to ensure that the performances of the engine are better than or equal to the performances of an aged engine.

As described in document EP 2 623 748, carrying out automatic in-flight monitoring of one or several operating parameters of a rotorcraft engine in order to check the state of health of this engine is already known.

However, this in-flight monitoring may be implemented, at most, once per hour of flight, because acquiring the operating parameters of the engine may require actions, such as momentarily switching off the rotorcraft cabin heater, for example. Such actions can be inconvenient in terms of crew comfort, but also challenging for the component of the air system which is required to perform these actions repeatedly.

Indeed, it is necessary to switch off the cabin heating in order to put the engine in a state comparable to the uninstalled generic model.

Document EP 3 217 242 describes the use of aircraft data recorded during flight to predict behavior of the aircraft engine.

In particular, it describes the use of a probabilistic model to determine the state of health of an aircraft engine. This method makes it possible, in particular, to predict the evolution of this engine health state as a function of an exhaust gas temperature value and this exhaust gas temperature exceeding a maximum threshold value during the flight of the aircraft.

However, such a method is therefore limited to monitoring the engine exhaust gas temperature in order to determine the health level of the engine. Thus, as in document EP 2 623 748, the air flow taken from the engine for heating the cabin is not measured for the engine health check and therefore is not taken into account. It is therefore also necessary to switch off the heating when measuring the engine exhaust gas temperature.

Document FR 3 006 785 describes methods for creating a database and creating a map of aircraft engine operating states and a method for monitoring the operation of an associated aircraft engine.

Furthermore, a first method for creating a database of operating states of a fleet of aircraft engines is disclosed. This first method comprises the following steps:

- acquiring parameters characterizing an operating state of engines of said fleet of engines;
- acquiring at least one item of degradation information indicative of a level of degradation of at least one engine from said fleet of engines; and
- storing series of parameters in said database, each series of parameters comprising parameters characterizing an operating state of one of said engines and, possibly, at least one item of degradation information indicative of a level of degradation of the engine.

Each series of parameters comprises parameters determined from measurements chosen from an exhaust gas temperature, a fuel flow rate, a rotational speed of a low-pressure shaft, a rotational speed of a high-pressure shaft, and temperatures and pressures at different points in the engine.

A second method relates to the creation of a map of aircraft engine operating states from a background map created using a database of operating states of a fleet of engines.

This background map comprises a set of cells, each cell being described by a code vector close to one or more series of parameters stored in the database.

In addition, a computer defines classes of cells by grouping together cells of the background map, the classes being defined according to a distance between cells and/or degradation information included in the series of parameters close to the code vectors of cells of the background map.

The background map may be created from the database of operating states according to Kohonen's self-organizing mapping technique. According to the second method, the computer is used to assign, to a cell of the map, at least one degradation rate relative to one item of degradation information corresponding to the proportion of the series of parameters comprising the degradation information, from the series of parameters close to the code vector of the cell.

Moreover, the classes of cells can be defined by the steps of:

creating candidate classes as a function of the distances between cells; and creating classes, each class grouping together a set of adjacent cells, the set of cells belonging to the previously described background map being formed by the intersection of a collection of candidate classes with a set of adjacent cells each having a degradation rate, relative to the same item of degradation information, that is higher than a determined threshold.

Such a second method allows trends in the degradation rates of engines belonging to a fleet of aircraft to be monitored.

SUMMARY

The object of the present disclosure is therefore to propose a method that helps overcome the abovementioned limitations. Furthermore, the disclosure allows a more precise calculation of an engine health level for each aircraft according to its actual use.

The disclosure therefore relates to an automatic diagnostic method for monitoring a state of health of at least one engine equipping an aircraft, the method comprising the following steps:

periodic in-flight acquisition of a plurality of flight data with sensors, the plurality of flight data being representative of a plurality of physico-chemical parameters;

identification, with a controller, from the plurality of flight data, of at least one predetermined engine health check phase and isolation, with the controller, of a sequence of significant data from the plurality of flight data produced during the engine health check phase or phases, the significant data of a sequence being acquired successively; and for each engine health check phase, calculation, with the controller, of at least one engine health index as a function of at least one control parameter of the engine or engines from the plurality of physico-chemical parameters.

According to the disclosure, such a method is remarkable wherein it comprises the following steps:

for each engine health index, generation, with the controller, of a point of an at least one-dimensional map, each point associating the engine health index with at least one value of at least one predetermined state parameter from the plurality of physico-chemical parameters, each predetermined state parameter corresponding to a dimension of the map, each value corresponding respectively to a value of the state parameter or parameters at an instant in the sequence of significant data for which the engine health index is calculated;

grouping together, with the controller, points of the map into at least one class of interest, each class of interest corresponding to a group of points spaced apart from each other in the map by a predetermined maximum distance;

monitoring, with the controller, of the engine health indices corresponding to the points of the class or classes of interest; and generation, with an alerter, of an information signal depending on the engine health indices monitored during the monitoring step.

In other words, the periodic acquisition of a plurality of flight data makes it possible to record a multitude of flight data, for example by means of an engine Health and Usage Monitoring System. Such a monitoring system may advantageously be installed on board the aircraft. These on-board Health and Usage Monitoring Systems (HUMS) can therefore be used to constantly and automatically collect flight data of the aircraft.

This flight data representative of a plurality of physico-chemical parameters may thus comprise attitudes of the aircraft, speeds or accelerations of the aircraft, altitudes of the aircraft, rotational speeds of the engine, engine torques, and temperatures, pressures or flow rates relating to fluids flowing in the aircraft or in an engine or indeed to the outside air.

The identification of at least one predetermined engine health check phase may be predetermined, for example, as a function of predetermined criteria and then allows insignificant data to be discarded in order to retain only sequences of significant data from the plurality of flight data from the periodic acquisition of a plurality of flight data.

For all of the engine health check phases, the controller calculates one or more engine health indices according to a predetermined law.

For example, such engine health indices may be determined by calculating a margin relating to torque, power or the temperature of the combustion gases from the engine. This margin corresponds, for example, to the difference between a current torque, power or temperature value and a minimum guaranteed value corresponding to an aged engine, taking into account the impact of installing the engine in the aircraft.

Furthermore, once the points have been generated with the controller, the points are grouped together into a class or into different distinct classes by comparing the distances separating each generated point and a barycenter of each class. This class or these classes are therefore predetermined, for example by test flights, simulations or indeed flights undertaken by users of a given type of aircraft. Furthermore, this class or these classes may also be updated according to a type of mission or a particular use of the aircraft.

Furthermore, the classes may advantageously be determined according to the values of state parameters corresponding to each engine health index calculated for a specific aircraft.

Moreover, the maps may be defined in a space with N dimensions greater than or equal to 1, N being the number of state parameters predetermined, for example, by a calculation method generally referred to by the expression "support-vector machine", in particular using a kernel function, such a kernel possibly being linear. Such a calculation method constitutes a supervised learning technique intended to solve regression problems.

In this case, the coordinates of a point C of the map may be written as $$\begin{bmatrix} C1 \\ \vdots \\ CN \end{bmatrix}$$

and the coordinates of the barycenter B may be written as $$\begin{bmatrix} B1 \\ \vdots \\ BN \end{bmatrix}.$$

For each of the N predetermined state parameters, a predetermined maximum distance Dln separating the points C from the barycenter B may be stored in the following form:

$$\begin{bmatrix} Dl1 \\ \vdots \\ DlN \end{bmatrix}.$$

This predetermined maximum distance Dln may be defined according to the influence of each predetermined state parameter on the calculation of the engine health indices.

For each of the N parameters, the normalized distance Dn between the barycenter B of a class and each point C can then be calculated. Such a normalized distance is then written $$\begin{bmatrix} D1 \\ \vdots \\ DN \end{bmatrix}$$

with $$Dx = \frac{Cx - Bx}{Dlx}$$

and x varying from 1 to N.

From the N distances Dn, the norm of the vector $(\overrightarrow{BC})$ is then calculated, such a norm being expressed in the following form:

$$\|\overrightarrow{BC}\| = \sqrt{\sum_{i=1}^{N} Di^2}.$$

A point C of a map then belongs to a class with barycenter B if $\|\overrightarrow{BC}\| \leq 1$.

For example, there may be two predetermined state parameters and, therefore, the map of points comprises a first state parameter on the X-axis and a second state parameter on the Y-axis.

Furthermore, the engine health indices may be calculated very frequently without compromising passenger comfort. Such a method therefore allows a large number of engine health index calculations to be performed and only the most representative calculations to be taken into account in order to provide additional services to users of the aircraft or to operators using a fleet of aircraft of this type.

Furthermore, the calculation of the plurality of engine health indices may use predetermined state parameters, and/or one or more classes, specifically for an aircraft or a particular aircraft variant, and/or for a take-off base from which the aircraft undertakes different missions.

Moreover, the monitoring of the variations over time of the engine health indices may be implemented class by class.

Finally, the generation of an item of information depending on the engine health indices belonging to the same class may consist, for example, of an item of information transmitted to a pilot of the aircraft in the form of a text message generated by a display or an audio message generated by a loudspeaker. Furthermore, the generated information may also consist of a graphical representation of the variations over time of the indices in the form of curves or graphs shown on a display such as a computer screen or a tablet, for example.

Advantageously, the method may comprise the identification, with an identification controller, of said at least one class of interest from at least two distinct classes, the class or classes of interest being identified as a function of at least one identification parameter chosen from the group comprising a frequency of appearance of a point in the class or classes in question and a distribution of the points in the map.

Such identification may therefore be implemented prior to the step of grouping together the points of the map. The method can then monitor all the engine health indices belonging to one or more classes of interest identified upstream from other flight data from the same aircraft, another aircraft or indeed a fleet of aircraft.

Certain classes may possibly be discarded and not taken into account if the number of points of a given class is insufficient.

Advantageously, the method may comprise the predetermination of the predetermined state parameter or parameters, the predetermination comprising the following substeps:

preliminary periodic acquisition, during at least one preliminary flight, of a plurality of preliminary flight data with sensors, the plurality of preliminary flight data being representative of a plurality of physico-chemical parameters;

calculation, with the predetermination controller, of a plurality of preliminary engine health indices as a function of a plurality of values of the control parameter or parameters of the engine or engines from the plurality of physico-chemical parameters;

generation, with the predetermination controller, of a database comprising the plurality of values of at least one preliminary control parameter associated with the plurality of corresponding preliminary engine health indices;

generation, with the predetermination controller, from a correlation between the plurality of preliminary engine health indices and the plurality of values of the preliminary control parameter or parameters of the engine or engines contained in the database, of a plurality of linear regression models, each linear regression model being associated with a preliminary control parameter or with a combination of several preliminary control parameters; and identification, with the predetermination controller, of the predetermined state parameter or parameters from the preliminary control parameter or the combination of several preliminary control parameters corresponding to each linear regression model, the identification depending on a goodness of fit of the plurality of linear regression models and a number of preliminary control parameters.

Such predetermination of the predetermined state parameter or parameters may for example be carried out once before implementing the method. The predetermination of the predetermined state parameter or parameters may also be implemented several times in order to update the grouping together of the points into classes if, for example, the number of points of the maps that cannot be associated with a class exceeds a predetermined value.

In practice, the controller and the predetermination controller may be separate from each other or formed by the same controller.

For example, there may be two predetermined state parameters and, therefore, each map then comprises a first state parameter on the X-axis and a second state parameter on the Y-axis.

Once the database has been generated, statistical calculation operations can be performed on the correlation between the plurality of values of the control parameter or parameters and the plurality of preliminary engine health indices.

For example, these calculations may comprise the calculation of a value P corresponding to the probability of a given statistical model under the null hypothesis obtaining the same value or a value even more extreme than that observed. Such a calculation can therefore be used to identify whether the plurality of calculated preliminary engine health indices is indeed significant.

Each preliminary control parameter and each combination of preliminary control parameters can then be ranked as a function of the different calculated values P. For a given number of one or more control parameters, the best preliminary control parameter and the best combinations of preliminary control parameters that have the lowest value P corresponding to the most significant result are then identified.

For the best preliminary control parameter and each best combination of X preliminary control parameters, the corresponding regression is calculated using, for example, an SVM regression algorithm or a gradient boosting algorithm.

Therefore, a linear determination coefficient referred to as the Pearson correlation coefficient, denoted R2 or score R2 expressed as a percentage, may be associated with each regression. Such a linear determination coefficient is representative of the goodness of fit of a linear regression.

This linear determination coefficient makes it possible, in particular, to provide an indication of the reliability of a preliminary engine health index modelled by the regression in relation to the original preliminary engine health index.

As is known, the higher the score R2, the higher the goodness of fit of the regression.

A choice is then made, from the set of regressions and their associated scores R2, of the regression representing the best compromise between the highest scores R2 and the lowest number of control parameters.

For example, if the scores R2 of two regressions are within 2% or 3% of each other, the regression corresponding to a single preliminary control parameter or to the combination having the lowest number of preliminary control parameters should be chosen.

Therefore, the identification of the predetermined state parameter or parameters makes it possible to guarantee maximum dispersion across each class.

Moreover, the preliminary flight or flights may comprise a plurality of flights performed with one or more aircraft.

In other words, a fleet of several aircraft, for example from the same aircraft family, may be used to implement the step of predetermination of the predetermined state parameter or parameters.

Advantageously, the monitoring of the engine health indices may comprise the calculation of a slope of a curve described by the engine health indices of a given class as a function of time and the comparison of the slope with a predetermined threshold value, the information signal being generated when the slope passes the predetermined threshold value.

Furthermore, such generation of the information signal may consist in indicating a maximum time period before performing a maintenance operation on the aircraft. Such a maximum time period may, for example, be determined by extrapolating the time remaining before the engine health indices reach a predefined value. Furthermore, the slope may pass the predetermined threshold value in an upward or downward direction.

Additionally, or alternatively, the monitoring of the engine health indices may comprise the identification of a discontinuity of a curve described by the engine health indices of a given class as a function of time, the information signal being generated when the discontinuity is identified.

In this case, the generation of the information signal may consist in indicating an immediate need to perform a maintenance operation on the aircraft.

Also, additionally, or alternatively, the monitoring of the engine health indices may comprise a comparison between a value of the engine health indices and another predetermined threshold value, the information signal being generated when the value of the engine health indices passes this other predetermined threshold value.

As with the slope, the value of the engine health indices may also pass the other predetermined threshold value in an upward or downward direction.

According to a first variant of the disclosure, the monitoring of the engine health indices may be carried out periodically with a predetermined period.

For example, this monitoring may be carried out once per hour, once per day, or on a weekly basis.

According to a second variant of the disclosure, the monitoring of the engine health indices may be carried out following each calculation of the engine health indices.

In this case, the monitoring depends directly on the use of the aircraft and its capacity to perform flight phases corresponding to engine health check phases.

Irrespective of the variant that is implemented, each time an engine health index is calculated, a counter indicating the periodicity of the calculations of the engine health indices can be reinitialized.

In practice, the method may comprise, for each class, the determination of a barycenter of the points and a weighting operation assigning a weight to each engine health index, the weight depending on one or more distances separating the point or points from the barycenter, the monitoring of the engine health indices being carried out depending on the weights of each engine health index by producing a weighted curve representative of the engine health indices and the associated weights, the information signal being generated when a slope of the weighted curve passes a predetermined threshold value, when a discontinuity of the weighted curve is identified or when a weighted value of the engine health indices passes another predetermined threshold value.

In other words, such a weighting operation makes it possible to favor the engine health indices that are closest to each other around a class center and therefore the engine health indices that are the most representative of a class, in order to limit the dispersion.

Advantageously, the method may comprise the storing of the plurality of flight data in a memory installed on board the aircraft during the flight phase of the aircraft.

The plurality of flight data may then be stored in the aircraft for subsequent transmission or use by the controller, for example.

In this case, the method may comprise the transmission of the plurality of flight data from the memory installed on board the aircraft to at least one ground station.

Such transmission may be carried out once the aircraft has landed, by wired or wireless means or indeed by using a removable memory that is extracted from the aircraft and connected with a ground station.

Such transmission may also be carried out during the flight of the aircraft by means of a transmitter arranged on the aircraft and a receiver connected to a ground station. The transmitter and the receiver then communicate with each other by means of a wireless communication method such as a mobile phone communication method (GSM, UMTS, GPRS, etc.), a satellite communication method or the like.

The object of the present disclosure is also an aircraft equipped with at least one engine, sensors for acquiring a plurality of flight data, a controller and an alerter.

According to the disclosure, such an aircraft is remarkable wherein the sensors, the controller and the alerter of the aircraft are configured to implement the abovementioned automatic diagnostic method. Such an aircraft may be an airplane or a rotorcraft and may or may not carry people or a pilot.

The present disclosure also relates to an arrangement comprising at least one ground station and at least one aircraft equipped with at least one engine and sensors for acquiring a plurality of flight data, said at least one ground station comprising a controller and an alerter.

According to the disclosure, such an arrangement is remarkable wherein the sensors, the controller and the alerter of the arrangement are configured to implement the abovementioned automatic diagnostic method.

BRIEF DESCRIPTION OF THE DRAWINGS

The disclosure and its advantages appear in greater detail in the context of the following description of embodiments given by way of illustration and with reference to the accompanying figures, wherein.

DETAILED DESCRIPTION

Elements that are present in more than one of the figures are given the same references in each of them.

As already disclosed, the present disclosure relates to the field of rotorcraft and, more specifically, to the field of predictive maintenance of one or more engines equipping a rotorcraft.

Figure 1:
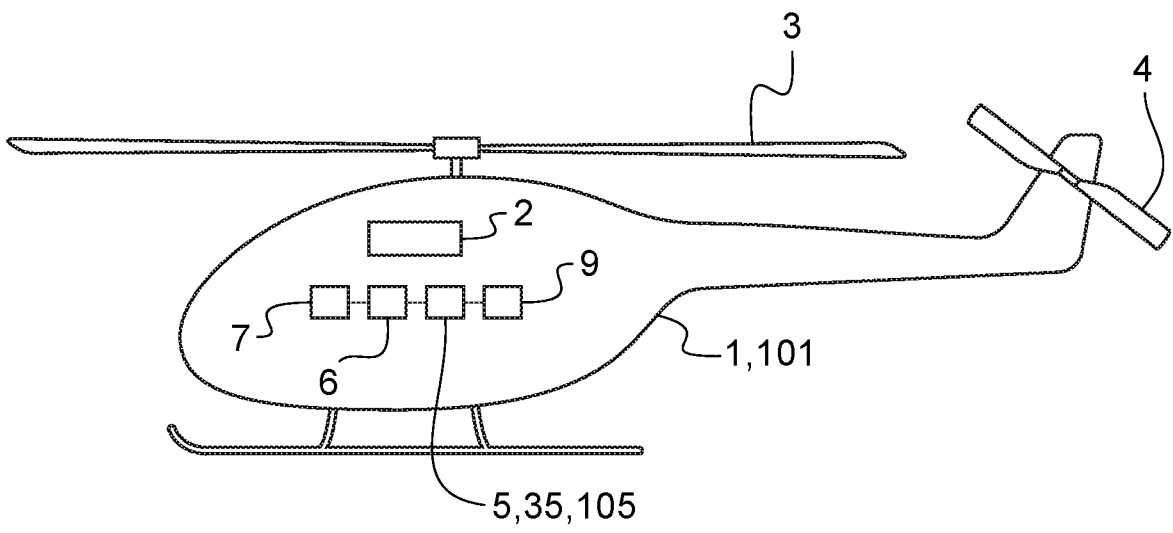
FIG. 1 is a schematic view of an aircraft according to the disclosure.

As shown in FIG. 1, an aircraft 1 comprises at least one engine 2 intended to rotate at least one rotor 3, 4. In the example shown, the aircraft 1 may be a rotorcraft. Therefore, the rotor 3, 4 may for example comprise a main rotor 3 contributing to the propulsion and/or lift of the aircraft 1 in the air and a rear rotor 4 helping to control the yaw movement of the aircraft 1 and counteracting the torque transmitted to a fuselage generated by the rotation of the main rotor 3.

Furthermore, in order to maintain the engine 2, it is particularly useful to monitor the evolution of the state of health of this engine 2. An automatic diagnostic method may therefore advantageously be implemented in order to carry out predictive maintenance of the aircraft 1.

In order to implement such a diagnostic method, the aircraft 1 comprises a plurality of sensors 7 for acquiring flight data representative of a plurality of physico-chemical parameters during a flight phase.

These sensors 7 may in particular comprise, for example, attitude sensing devices, an inertial unit, a satellite positioning system, an altimeter, for example a barometric altimeter, sensing devices measuring the temperature, pressure or flow rate of a fluid flowing in the aircraft 1 or the air surrounding the aircraft 1. The acquired flight data may thus comprise attitudes of the aircraft 1, speeds or accelerations of the aircraft 1, altitudes of the aircraft 1, rotational speeds of the engine, engine torques, and temperatures, pressures or flow rates relating to fluids flowing in the aircraft or in an engine or indeed to the outside air.

"Sensor" should be understood to mean a physical sensing device capable of directly measuring the parameter in question but also a system that may comprise one or more physical sensing devices as well as means for processing the signal that make it possible to provide an estimation of the parameter based on the measurements provided by these physical sensing devices. Similarly, the notion of measuring parameters refers to both a raw measurement from a physical sensing device and a measurement obtained by relatively complex processing of raw measurement signals. Furthermore, such a measurement generated by a processing operation may in particular be produced by a virtual sensing device.

The acquired flight data may then be stored in a memory 6 installed on board the aircraft 1.

Furthermore, the aircraft 1 may also comprise at least one controller 5, 35, 105 for processing the flight data stored in the memory 6.

Such a controller 5, 35, 105 may comprise one or more computers and, for example, at least one processor and at least one memory, at least one integrated circuit, at least one programmable system, or at least one logic circuit, these examples not limiting the scope to be given to the term "computer". The term "processor" may refer equally to a central processing unit (CPU), a graphics processing unit (GPU), a digital signal processor (DSP), a microcontroller, etc.

The processing operation implemented by this controller 5, 35, 105 is described below in greater detail according to the different steps of the automatic diagnostic methods, with reference to FIGS. 3 to 9. Such a controller 5 can also be used to calculate health indices of the engine or engines 2 from flight data acquired by the sensors 7.

Moreover, the aircraft 1 may comprise an alerter 9 for generating an information signal depending on these calculated engine health indices and therefore the state of health of the engine or engines 2.

This alerter 9 can be used to generate an item of information depending on the variations of the values of the engine health indices. Such an alerter 9 is also able to generate a first alert and a second alert, that are different. Each alert may be in the form of a visual alarm, for example emitting a light with a light-emitting diode or an equivalent or one or more characters being displayed on a screen, an audible alarm, via a loudspeaker, and/or a haptic alarm, for example by means of a vibrating unit causing a member held or worn by an individual to vibrate.

Figure 2:
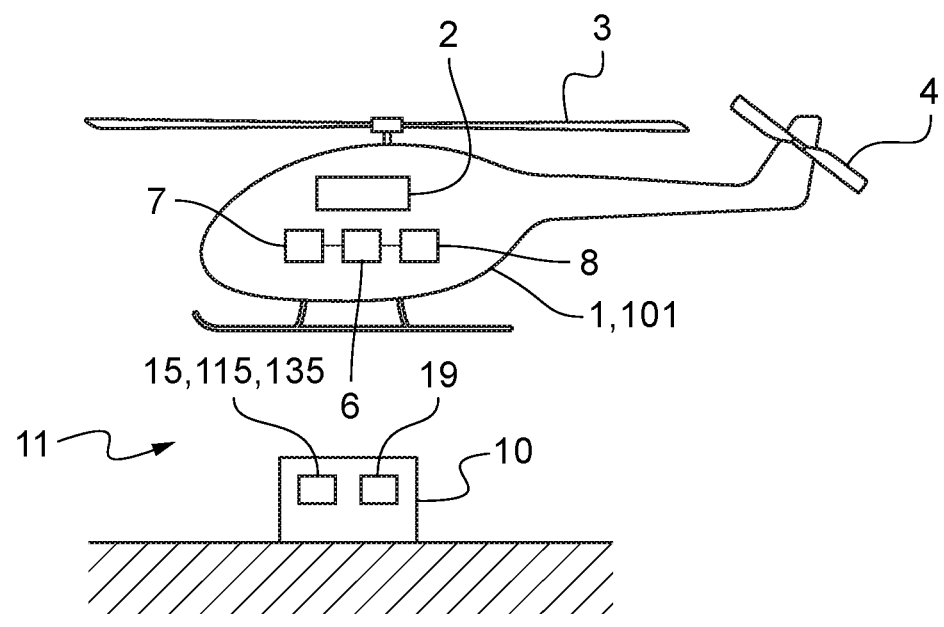
FIG. 2 is a schematic view of an arrangement according to the disclosure.

As shown in FIG. 2, the disclosure also relates to an arrangement 11 comprising at least one aircraft 1, or indeed another aircraft 101, and at least one ground station 10.

In this case, the aircraft 1 comprises transmission means 8 for transmitting the flight data stored in the memory 6 to the ground station or stations 10.

Similarly, the other aircraft 101 comprises at least one other engine 2, other sensors 7 for acquiring flight data, another memory 6 for storing this flight data and other transmission means 8 for transmitting the flight data stored in the other memory 6 to the ground station or stations 10.

Furthermore, the ground station or stations 10 may also comprise a controller 15, 115, 135 for processing the flight data transmitted by at least one aircraft 1, or also by at least one other aircraft 101.

As with the on-board controller 5, 35, 105, such a controller 15, 115, 135 may comprise one or more computers and, for example, at least one processor and at least one memory, at least one integrated circuit, at least one programmable system, or at least one logic circuit, these examples not limiting the scope to be given to the term "computer". The term "processor" may refer equally to a central processing unit (CPU), a graphics processing unit (GPU), a digital signal processor (DSP), a microcontroller, etc.

Moreover, said at least one ground station 10 may comprise an alerter 19 for indicating the state of health of said at least one engine 2, or also of said at least one other engine 2.

This alerter 19 can be used to generate an item of information depending on the variations of the engine health indices. Such an alerter 19 is able to generate a first alert and a second alert, that are different. Each alert may be in the form of a visual alarm, for example emitting a light with a light-emitting diode or an equivalent or one or more characters being displayed on a screen, an audible alarm, via a loudspeaker, and/or a haptic alarm, for example by means of a vibrating unit causing a member held or worn by an individual to vibrate.

The alerter 19 may also comprise a graph generator for generating a graphical representation of the variations over time of the state of health of said at least one engine 2, or also of said at least one other engine 2.

A technician responsible for the maintenance of the aircraft 1, 101 may be assigned to replace, at short notice, all or part of the engine or engines 2, the installation of this or these engines 2 in the aircraft 1, 101, or more generally the system degrading the performances of the installed engine or engines 2. A part that is damaged, worn or simply clogged, such as a filter, can then be replaced by the technician by performing a predictive maintenance operation.

12

Figure 3:
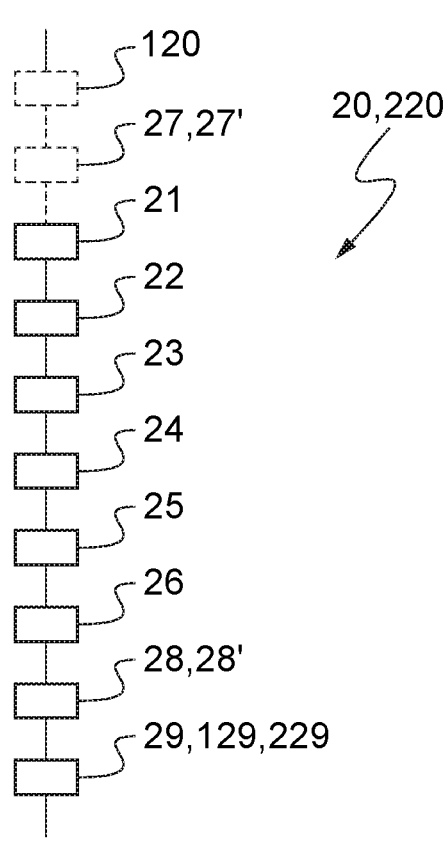
FIG. 3 is a logic diagram showing a first example of an automatic diagnostic method according to the disclosure.

As shown in FIG. 3, the disclosure therefore also relates to an automatic diagnostic method 20, 220 for monitoring a state of health of the engine or engines 2 equipping an aircraft 1.

Firstly, optionally, the method 20, 220 may comprise the predetermination 120 of one or more predetermined state parameters. Such predetermination 120 is described in greater detail in reference to FIG. 4.

The method 20, 220 then comprises the periodic in-flight acquisition 21 of a plurality of flight data with the sensors 7 described above, then the identification 22, with the controller 5, 15, from the plurality of flight data, of at least one predetermined engine health check phase and the isolation 23, with the controller 5, 15, of a sequence of significant data from the plurality of flight data produced during the engine health check phase or phases.

Furthermore, such significant data of a sequence are acquired successively and substantially continuously over time.

The method 20, 220 next comprises, for each engine health check phase, the calculation 24, with the controller 5, 15, of at least one engine health index as a function of at least one control parameter of the engine or engines 2 from the plurality of physico-chemical parameters.

For example, such engine health indices may be determined by calculating a margin relating to torque, power or the temperature of the combustion gases from the engine. This margin then corresponds to the difference between a current torque, power or temperature value and a minimum guaranteed value corresponding to an aged engine, taking into account the effects of installing this engine on the aircraft.

The method 20, 220 then comprises, for each engine health index, the generation 25, with the controller 5, 15 of a point of an at least one-dimensional map, each point associating this engine health index with at least one value of at least one predetermined state parameter from the plurality of physico-chemical parameters, each predetermined state parameter corresponding to a dimension of the map. Each value therefore corresponds respectively to a value of said at least one state parameter at an instant of the sequence of significant data for which the engine health index is calculated.

Furthermore, such a predetermined state parameter may be identified during the preliminary step 120 of the method 20, 220.

Figure 7:
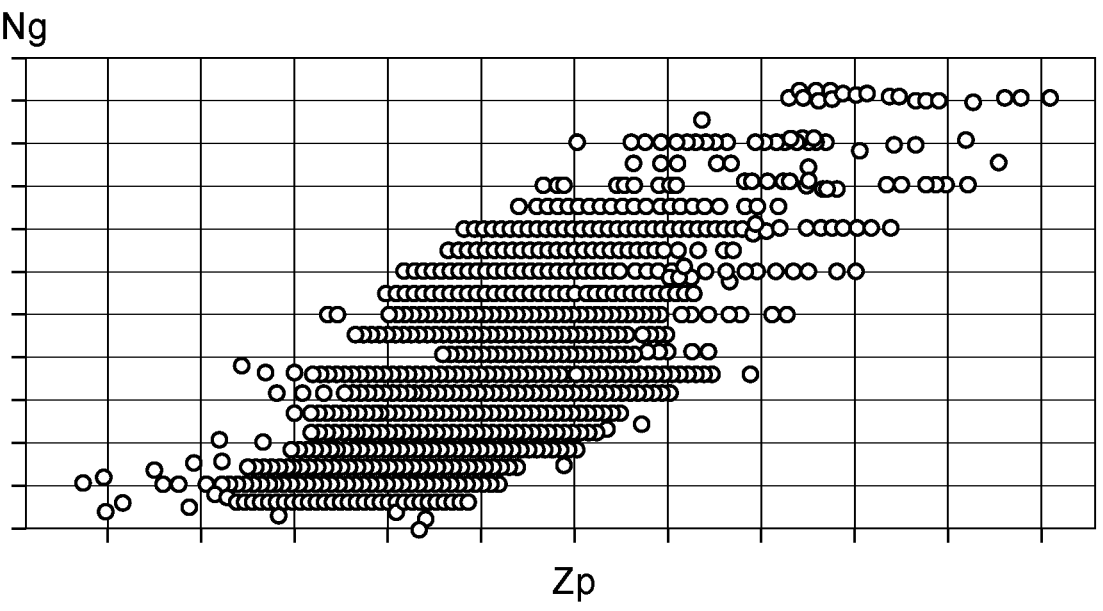
FIG. 7 is a diagram showing a first map obtained by an automatic diagnostic method according to the disclosure.

A map as generated in the generation step 25 is shown in FIG. 7. This map is, for example, a two-dimensional map, and comprises, on the X-axis, a first predetermined state parameter such as the altitude pressure Zp and, on the Y-axis, a second predetermined state parameter such as the rotational speed Ng of a gas generator of the engine 2.

The generation step 25 therefore makes it possible to plot a point cloud corresponding to the instants of the check phases at which engine health indices have been calculated.

The method 20, 220 then comprises the grouping together 26, with the controller 5, 15, of the points of the map into at least one class of interest Ci1, Ci2, each class of interest Ci1, Ci2 corresponding to a group of points spaced apart from each other in the map by a predetermined maximum distance.

Figure 8:
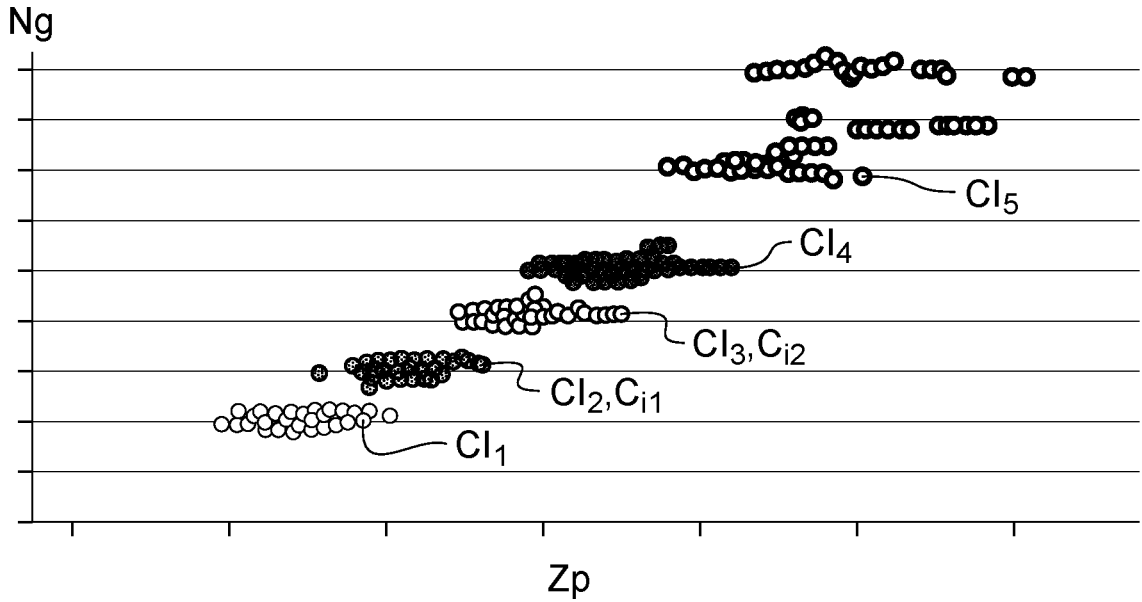
FIG. 8 is a diagram showing the grouping together into classes of a map obtained by an automatic diagnostic method according to the disclosure.

Such a grouping together 26 is shown in FIG. 8. Each class of interest Ci1, Ci2 comprises a certain number of points previously generated during the generation step 25.

The method 20, 220 then comprises the monitoring 28, 28', with the controller 5, 15, of the engine health indices corresponding to the points of the class or classes of interest Ci1, Ci2.

Prior to the step of grouping together 26, the method 20, 220 may comprise the identification 27, 27', with an identification controller 35, 135, of the class or classes of interest Ci1, Ci2 from at least two distinct classes Cl1, Cl2, Cl3, Cl4, Cl5, the class or classes of interest Ci1, Ci2 being identified as a function of at least one identification parameter chosen from the group comprising a frequency of appearance of a point in the class or classes in question and a distribution of the points in the map.

Such an identification controller 35, 135 may, for example, be combined with or separate from the controller 5, 15. Moreover, the identification controller 35 may be installed in one or more aircraft 1, 101. The identification controller 135 may be arranged in one or more ground stations 10.

Furthermore, according to a first embodiment, this monitoring 28 of the engine health indices may be carried out periodically with a predetermined period.

According to a second embodiment, the monitoring 28' of the engine health indices may be carried out following each calculation 24 of the engine health indices.

Finally, the method 20, 220 comprises the generation, 29, 129, 229, with the alerter 9, 19, of the information signal depending on the engine health indices monitored during the monitoring step 28, 28'.

For example, the monitoring 28, 28' of the engine health indices may comprise the calculation of a slope of a curve described by the engine health indices of a given class of interest Ci1, Ci2 as a function of time and the comparison of this slope with a predetermined threshold value, the information signal being generated 29 when the slope passes this predetermined threshold value.

According to another example, the monitoring 28, 28' of the engine health indices may comprise the identification of a discontinuity of a curve described by the engine health indices of a given class of interest Ci1, Ci2 as a function of time, the information signal being generated 129 when the discontinuity is identified.

According to another example, the monitoring 28, 28' of the engine health indices may comprise a comparison between the values of the engine health indices and another predetermined threshold value, the information signal being generated 229 when a value of the engine health indices passes this other predetermined threshold value.

Figure 4:
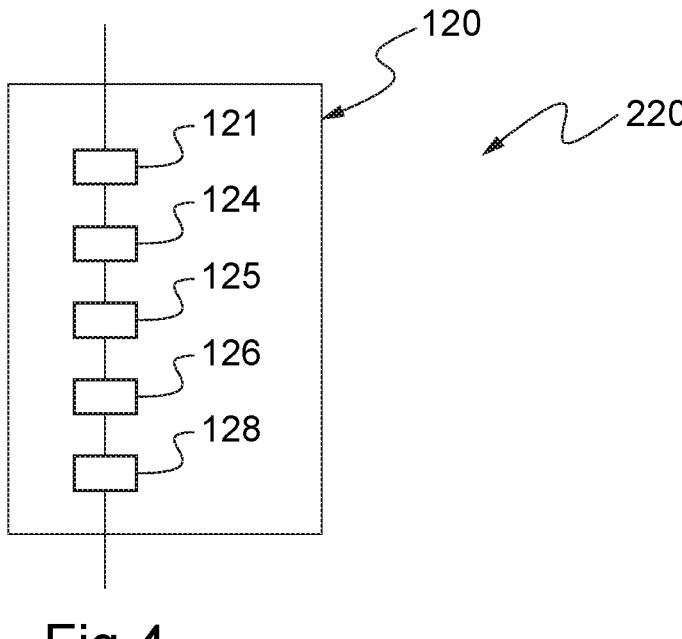
FIG. 4 is a logic diagram showing sub-steps of the first example of an automatic diagnostic method according to the disclosure.

As shown in FIG. 4, the predetermination 120 of the predetermined state parameter or parameters may comprise the preliminary periodic acquisition 121, during at least one preliminary flight, of a plurality of preliminary flight data with the sensors 7. As described above for the plurality of flight data, the plurality of preliminary flight data is representative of a plurality of physico-chemical parameters measured during flight.

Furthermore, a plurality of preliminary flights may be undertaken with one or more aircraft 1, 101 during this preliminary periodic acquisition 121.

A predetermination controller 105, 115 may, for example, be combined with or separate from the controller 5, 15. Moreover, the predetermination controller 105 may be installed in one or more aircraft 1, 101. The predetermination controller 115 may be arranged in one or more ground stations 10.

Therefore, the predetermination 120 comprises the calculation 124, with the predetermination controller 105, 115, of a plurality of preliminary engine health indices as a function of a plurality of values of the control parameter or parameters of the engine or engines 2 from the plurality of physico-chemical parameters.

The predetermination 120 then comprises the generation 125, with the predetermination controller 105, 115, of a database comprising the plurality of values of the control parameter or parameters associated with the corresponding plurality of preliminary engine health indices.

Once the database has been generated during the generation step 125, the predetermination 120 may implement statistical calculation operations designed to define the correlation between the plurality of values of the control parameter or parameters and the plurality of preliminary engine health indices.

For example, these calculations may comprise the calculation of a value P corresponding to the probability of a given statistical model under the null hypothesis obtaining the same value or a value even more extreme than that observed. Such a calculation can therefore be used to identify whether the plurality of calculated preliminary engine health indices is indeed significant.

Each preliminary control parameter and each combination of preliminary control parameters can then be ranked as a function of the different calculated values P. For a given number of one or more control parameters, the best preliminary control parameter and the best combinations of preliminary control parameters that have the lowest value P corresponding to the most significant result are then identified.

The predetermination 120 then comprises the generation 126, with the predetermination controller 105, 115, from this correlation between the plurality of preliminary engine health indices and the plurality of values of the control parameter or parameters of the engine or engines 2 contained in the database, of a plurality of linear regression models, each linear regression model being associated with a preliminary control parameter or with a combination of several preliminary control parameters.

Finally, the predetermination 120 comprises the identification 128, with the predetermination controller 105, 115, of the predetermined state parameter or parameters from the preliminary control parameter or the combination of several preliminary control parameters corresponding to each linear regression model, the identification 128 depending on a goodness of fit of the plurality of linear regression models and a number of control parameters.

Such a database may in particular be in the form of a table, a chart or a matrix comprising, in columns, each value of a preliminary control parameter and each preliminary engine health index, and each row corresponding to a measurement instant of these preliminary control parameters.

Based on all of these rows of the database, a correlation can then be carried out, and a determination coefficient referred to as the $R^2$ score is calculated. Such a score $R^2$ can then be used to estimate the goodness of fit of each of the corresponding linear regressions.

In particular, the calculated scores $R^2$ can be ranked and the highest score $R^2$ chosen or, if two maximum scores $R^2$ are close to each other, the score $R^2$ corresponding to the combination of control parameters comprising the smaller number of control parameters can be chosen.

For example, if a combination of two control parameters A and C obtains a score of 95% and a combination of three control parameters A, B and C obtains a score $R^2$ of 96%, the combination of the two control parameters A and C may be preferred because it is simpler and requires fewer calculations in order to monitor a state of health of the engine or engines 2 equipping an aircraft 1, 101.

Figure 5:
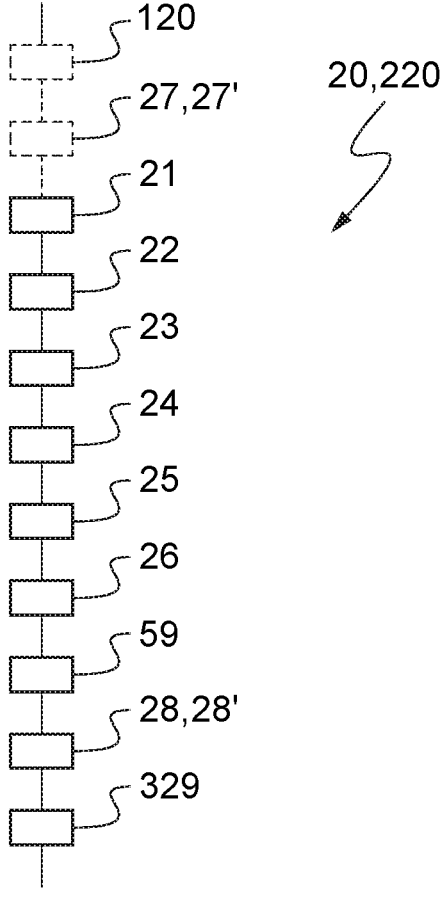
FIG. 5 is a logic diagram showing a second embodiment of an automatic diagnostic method according to the disclosure.

As shown in FIG. 5, the method 20, 220 may comprise, for each class, the determination of a barycenter of the points and a weighting operation 59 assigning a weight to each engine health index, the weight depending on a distance separating the point or points from the barycenter. In this case, the monitoring 28, 28' of the engine health indices may be implemented depending on the weights of each engine health index by producing a weighted curve representative of the engine health indices and the associated weights.

The information signal is generated 329 when a slope of the weighted curve is lower than a predetermined threshold value, when a discontinuity of the weighted curve is identified or when a weighted value of the engine health indices passes another predetermined threshold value.

Figure 6:
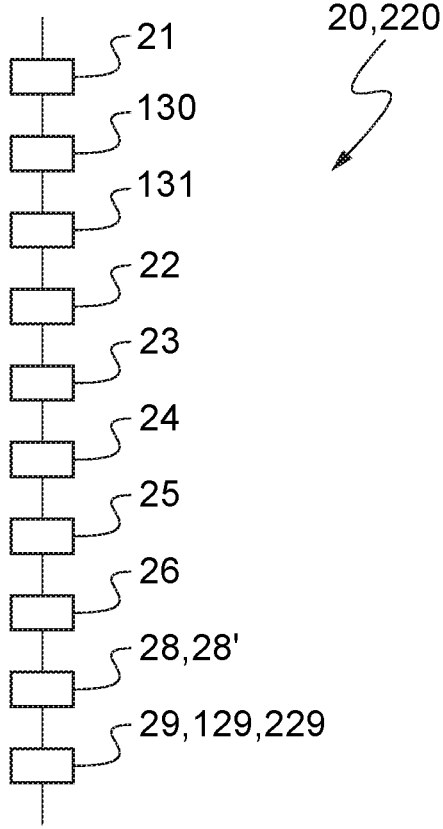
FIG. 6 is a logic diagram showing a third embodiment of an automatic diagnostic method according to the disclosure.

As shown in FIG. 6, the method 20, 220 may also comprise the storing 130 of the plurality of flight data in the memory 6 installed on board the aircraft 1 during the flight phase of the aircraft 1.

Alternatively, or additionally, the method 20, 220 may also comprise the transmission 131 of the plurality of flight data from the aircraft 1 to at least one ground station 10.

Naturally, the present disclosure is subject to numerous variations as regards its implementation. Although several embodiments are described above, it should readily be understood that it is not conceivable to identify exhaustively all the possible embodiments. It is naturally possible to envisage replacing any of the means described by equivalent means without going beyond the ambit of the present disclosure.

What is claimed is:

1. An automatic diagnostic method for monitoring a state of health of at least one engine equipping an aircraft, the method comprising the following steps:

periodic in-flight acquisition of a plurality of flight data with sensors, the plurality of flight data being representative of a plurality of physico-chemical parameters;

identification, with a controller, from the plurality of flight data, of at least one predetermined engine health check phase and isolation, with the controller, of a sequence of significant data from the plurality of flight data produced during the at least one engine health check phase, the significant data of a sequence being acquired successively; and for each engine health check phase, calculation, with the controller, of at least one engine health index as a function of at least one control parameter of the at least one engine from the plurality of physico-chemical parameters, wherein the method comprises the following steps:

for each engine health index, generation, with the controller, of a point of an at least one-dimensional map, each point associating the engine health index with at least one value of at least one predetermined state parameter from the plurality of physico-chemical parameters, each predetermined state parameter corresponding to a dimension of the map, each value corresponding respectively to a value of the at least one predetermined state parameter at an instant in the sequence of significant data for which the engine health index is calculated;

grouping together, with the controller, of the points of the map into at least one class of interest, each class of interest corresponding to a group of points spaced apart from each other in the map by a predetermined maximum distance;

monitoring, with the controller, of the engine health indices corresponding to the points of the at least one class of interest; and generation, with an alerter, of an information signal depending on the engine health indices monitored during the monitoring step;

wherein the method comprises, for each class, the determination of a barycenter of the points and a weighting operation assigning a weight to each engine health index, the weight depending at least on a distance separating the at least one point from the barycenter, the monitoring of the engine health indices being carried out depending on the weights of each engine health index by producing a weighted curve representative of the engine health indices and the associated weights, the information signal being generated when a slope of the weighted curve passes a predetermined threshold value, when a discontinuity of the weighted curve is identified or when a weighted value of the engine health indices passes another predetermined threshold value.

2. The method according to claim 1, wherein the method comprises identification, with an identification controller, of the at least one class of interest from at least two distinct classes, the at least one class of interest being identified as a function of at least one identification parameter chosen from the group comprising a frequency of appearance of a point in the at least one class of interest in question and a distribution of the points in the map.

3. The method according to claim 1, wherein the method comprises predetermining the at least one predetermined state parameter, the predetermination comprising the following sub-steps:

preliminary periodic acquisition, during at least one preliminary flight, of a plurality of preliminary flight data with sensors, the plurality of preliminary flight data being representative of a plurality of physico-chemical parameters;

calculation, with the predetermination controller, of a plurality of preliminary engine health indices as a function of a plurality of values of at least one preliminary control parameter of the at least one engine from the plurality of physico-chemical parameters;

generation, with the predetermination controller, of a database comprising the plurality of values of the at least one preliminary control parameter associated with the corresponding plurality of preliminary engine health indices;

generation, with the predetermination controller, from a correlation between the plurality of preliminary engine health indices and the plurality of values of the at least one preliminary control parameter of the at least one engine contained in the database, of a plurality of linear regression models, each linear regression model being associated with a preliminary control parameter or with a combination of several preliminary control parameters; and identification, with the predetermination controller, of the predetermined state parameter(s) from the preliminary control parameter or the combination of several preliminary control parameters corresponding to each linear regression model, the identification depending on a goodness of fit of the plurality of linear regression models and a number of control parameters.

4. The method according to claim 3, wherein the at least one preliminary flight comprises a plurality of flights performed with one or more aircraft.

5. The method according to claim 1, wherein the monitoring of the engine health indices comprises the calculation of a slope of a curve described by the engine health indices of a given class of interest as a function of time and the comparison of the slope with a predetermined threshold value, the information signal being generated when the slope passes the predetermined threshold value.

6. The method according to claim 1, wherein the monitoring of the engine health indices comprises the identification of a discontinuity of a curve described by the engine health indices of a given class of interest as a function of time, the information signal being generated when the discontinuity is identified.

7. The method according to claim 1, wherein the monitoring of the engine health indices comprises the comparison between a value of the engine health indices and another predetermined threshold value, the information signal being generated when the value of the engine health indices passes the other predetermined threshold value.

8. The method according to claim 1, wherein the monitoring of the engine health indices is carried out periodically with a predetermined period.

9. The method according to claim 1, wherein the monitoring of the engine health indices is carried out following each calculation of the engine health indices.

10. The method according to claim 1, wherein the method comprises the storing of the plurality of flight data in a memory installed on board the aircraft during the flight phase of the aircraft.

11. The method according to claim 1, wherein the method comprises the transmission of the plurality of flight data from the aircraft to at least one ground station.

12. An aircraft equipped with at least one engine, sensors for acquiring a plurality of flight data, a controller and an alerter, wherein the sensors, the controller and the alerter of the aircraft are configured to implement the automatic diagnostic method according to claim 1.

13. An arrangement comprising at least one ground station and at least one aircraft equipped with at least one engine and sensors for acquiring a plurality of flight data, the at least one ground station comprising a controller and an alerter, wherein the sensors, the controller and the alerter of the arrangement are configured to implement the automatic diagnostic method according to claim 1.

14. An automatic diagnostic method for monitoring a state of health of at least one aircraft engine, the method comprising:

using sensors to periodically conduct in-flight acquisition of a plurality of flight data representative of a plurality of physico-chemical parameters;

using a controller to identify from the plurality of flight data, at least one predetermined engine health check phase and to isolate a sequence of significant data from the plurality of flight data produced during the at least one engine health check phase, the significant data of a sequence being acquired successively; and using the controller to calculate for each engine health check phase at least one engine health index as a function of at least one control parameter of the at least one engine from the plurality of physico-chemical parameters, wherein the method further comprises:

generating with the controller, for each engine health index, a point of an at least one-dimensional map, each point associating the engine health index with at least one value of at least one predetermined state parameter from the plurality of physico-chemical parameters, each predetermined state parameter corresponding to a dimension of the map, each value corresponding respectively to a value of the at least one predetermined state parameter at an instant in the sequence of significant data for which the engine health index is calculated;

grouping together, with the controller, of the points of the map into at least one class of interest, each class of interest corresponding to a group of points spaced apart from each other in the map by a predetermined maximum distance;

monitoring, with the controller, of the engine health indices corresponding to the points of the at least one class of interest; and generating, with an alerter, an information signal depending on the engine health indices monitored during the monitoring step;

wherein the method comprises, for each class, the determination of a barycenter of the points and a weighting operation assigning a weight to each engine health index, the weight depending at least on a distance separating the at least one point from the barycenter, the monitoring of the engine health indices being carried out depending on the weights of each engine health index by producing a weighted curve representative of the engine health indices and the associated weights, the information signal being generated when a slope of the weighted curve passes a predetermined threshold value, when a discontinuity of the weighted curve is identified or when a weighted value of the engine health indices passes another predetermined threshold value.

15. The method according to claim 14, wherein the method comprises identification, with an identification controller, of the at least one class of interest from at least two distinct classes, the at least one class of interest being identified as a function of at least one identification parameter chosen from the group comprising a frequency of appearance of a point in the at least one class of interest in question and a distribution of the points in the map.

16. The method according to claim 14, wherein the method comprises predetermining the at least one predetermined state parameter, the predetermination comprising the following sub-steps:

preliminary periodic acquisition, during at least one preliminary flight, of a plurality of preliminary flight data with sensors, the plurality of preliminary flight data being representative of a plurality of physico-chemical parameters;

calculation, with the predetermination controller, of a plurality of preliminary engine health indices as a function of a plurality of values of at least one preliminary control parameter of the at least one aircraft engine from the plurality of physico-chemical parameters;

generation, with the predetermination controller, of a database comprising the plurality of values of the at least one preliminary control parameter associated with the corresponding plurality of preliminary engine health indices;

generation, with the predetermination controller, from a correlation between the plurality of preliminary engine health indices and the plurality of values of the at least one preliminary control parameter of the at least one aircraft engine contained in the database, of a plurality of linear regression models, each linear regression model being associated with a preliminary control parameter or with a combination of several preliminary control parameters; and identification, with the predetermination controller, of the predetermined state parameter(s) from the preliminary control parameter or the combination of several preliminary control parameters corresponding to each linear regression model, the identification depending on a goodness of fit of the plurality of linear regression models and a number of control parameters.

17. The method according to claim 16, wherein the at least one preliminary flight comprises a plurality of flights performed with one or more aircraft.

18. The method according to claim 14, wherein the monitoring of the engine health indices comprises the calculation of a slope of a curve described by the engine health indices of a given class of interest as a function of time and the comparison of the slope with a predetermined threshold value, the information signal being generated when the slope passes the predetermined threshold value.

19. An aircraft equipped with at least one of flight data, engine, sensors for acquiring a plurality a controller and an alerter, wherein the sensors, the controller and the alerter of the aircraft are configured to implement the automatic diagnostic method according to claim 14.

20. An arrangement comprising at least one ground station and at least one aircraft equipped with at least one engine and sensors for acquiring a plurality of flight data, the at least one ground station comprising a controller and an alerter, wherein the sensors, the controller and the alerter of the arrangement are configured to implement the automatic diagnostic method according to claim 14.

\* \* \* \* \*